(12) United States Patent
Saito et al.

(10) Patent No.: US 10,731,716 B2
(45) Date of Patent: Aug. 4, 2020

(54) AUTOMATIC CLUTCH DEVICE

(71) Applicant: NTN CORPORATION, Osaka (JP)

(72) Inventors: Takahide Saito, Shizuoka (JP); Koji Sato, Shizuoka (JP); Kimihito Ushida, Shizuoka (JP)

(73) Assignee: NTN CORPORATION, Osaka (JP)

( * ) Notice: Subject to any disclaimer, the term of this patent is extended or adjusted under 35 U.S.C. 154(b) by 91 days.

(21) Appl. No.: 15/758,487

(22) PCT Filed: Aug. 31, 2016

(86) PCT No.: PCT/JP2016/075514
§ 371 (c)(1),
(2) Date: Mar. 8, 2018

(87) PCT Pub. No.: WO2017/043393
PCT Pub. Date: Mar. 16, 2017

(65) Prior Publication Data
US 2018/0274601 A1    Sep. 27, 2018

(30) Foreign Application Priority Data

Sep. 9, 2015   (JP) .................................. 2015-177644
Sep. 14, 2015  (JP) .................................. 2015-180693

(51) Int. Cl.
*F16D 28/00*   (2006.01)
*F16D 23/12*   (2006.01)
(Continued)

(52) U.S. Cl.
CPC ............. *F16D 28/00* (2013.01); *F16D 23/12* (2013.01); *F16H 25/12* (2013.01);
(Continued)

(58) Field of Classification Search
CPC .... F16D 28/00; F16D 2023/123; F16D 23/12; F16H 25/12; F16H 1/16
See application file for complete search history.

(56) References Cited

U.S. PATENT DOCUMENTS 4,291,588 A * 9/1981 Justice ................. F04B 7/0065
                                                166/105
4,417,860 A * 11/1983 Justice ................. F04B 7/0065
                                                417/415
(Continued)

FOREIGN PATENT DOCUMENTS

| CN | 101273212 | 9/2008 |
| EP | 0 992 700 | 4/2000 |

(Continued)

OTHER PUBLICATIONS

International Preliminary Report on Patentability dated Mar. 13, 2018 in International (PCT) Application No. PCT/JP2016/075514.
(Continued)

*Primary Examiner* — Stacey A Fluhart
(74) *Attorney, Agent, or Firm* — Wenderoth, Lind & Ponack, L.L.P.

(57) ABSTRACT

An automatic clutch device includes an axial force generating mechanism formed by an electric motor adjacent to the outer periphery of an end of an input shaft of a transmission, and a rotation-linear motion conversion mechanism for converting the rotation of the rotor of the electric motor to a linear motion of a release bearing. The rotation-linear motion conversion mechanism includes plural tubes having different diameters and slidably fitted one in another to form a telescopic tube assembly on the input shaft; and cam mechanisms each disposed between a respective opposed pair of the tubes for converting the rotation of the larger- (Continued)

diameter one of the pair of tubes to a linear motion of the smaller-diameter one of the pair.

8 Claims, 15 Drawing Sheets

(51) Int. Cl.
    *F16H 25/12* (2006.01)
    *F16H 25/20* (2006.01)
    *F16D 13/56* (2006.01)
    *F16H 1/06* (2006.01)
    *F16H 1/16* (2006.01)

(52) U.S. Cl.
    CPC ... *F16H 25/2025* (2013.01); *F16D 2013/565* (2013.01); *F16D 2023/123* (2013.01); *F16H 1/06* (2013.01); *F16H 1/16* (2013.01)

(56) References Cited

U.S. PATENT DOCUMENTS

| | | |
|---|---|---|
| 2010/0219034 A1 | 9/2010 | Wheals et al. |
| 2016/0040731 A1 | 2/2016 | Fukunaga et al. |
| 2018/0100569 A1* | 4/2018 | Imafuku ................ B60K 17/02 |

FOREIGN PATENT DOCUMENTS

| | | |
|---|---|---|
| EP | 2 503 174 | 9/2012 |
| JP | 2001-41258 | 2/2001 |
| JP | 2003-097597 | 4/2003 |
| JP | 2004-044520 | 2/2004 |
| JP | 2004-225884 | 8/2004 |
| JP | 2004-308709 | 11/2004 |
| JP | 2007-315512 | 12/2007 |
| JP | 2009-100627 | 5/2009 |
| JP | 2009-144741 | 7/2009 |
| JP | 2009-281570 | 12/2009 |
| JP | 2010-78156 | 4/2010 |
| JP | 2014-202238 | 10/2014 |
| WO | 2011/062091 | 5/2011 |
| WO | 2015/082101 | 6/2015 |

OTHER PUBLICATIONS

International Search Report dated Nov. 29, 2016 in International (PCT) Application No. PCT/JP2016/075514.

* cited by examiner

AUTOMATIC CLUTCH DEVICE

TECHNICAL FIELD

The present invention relates to an automatic clutch device for selectively transmitting and not transmitting the power from an engine crankshaft to the input shaft of the transmission.

BACKGROUND ART

JP Patent Publication 2010-78156A (hereinafter JP '156) and JP Patent Publication 2014-202238A (hereinafter JP '238) disclose known automatic clutch devices for automatically engaging and disengaging manual transmissions (MT) or automated manual transmissions (AMT).

The automatic clutch device disclosed in JP '156 is configured such that, when the clutch pedal is depressed, hydraulic pressure is generated in a master cylinder mechanically connected to the clutch pedal, and is supplied to a clutch release cylinder, the clutch release cylinder pivots a release fork, thereby pressing a release bearing, a pressure plate is pressed against a flywheel under the pressing force applied to the pressure plate from the release bearing, and the clutch device engages.

The automatic clutch device disclosed in JP '238 is configured, similar to the clutch device of JP '156, such that hydraulic pressure generated in the master cylinder by depressing the clutch pedal is supplied to a clutch release cylinder, the clutch release cylinder pivots a release fork, the release fork presses a release bearing, and the clutch device disengages.

Since the clutch device of either of JP '156 and JP '238 is configured to be engaged and disengaged by pivoting the release fork with the clutch release cylinder, such clutch devices tend to be large in size. Moreover, since such clutch devices require a hydraulic pump, and pipe connections between the hydraulic pump and the clutch release cylinder, a large installation space is needed for such clutch devices.

While the ambient temperature is low, hydraulic pressure used to activate the clutch release cylinder flows less smoothly in the pipes due to elevated viscosity of the hydraulic oil, thus deteriorating responsiveness of the clutch release cylinder.

SUMMARY OF THE INVENTION

An object of the present invention is to reduce the size, and improve responsiveness, of an automatic clutch device of the type that selectively transmits power from the engine to the input shaft of the transmission by applying a pushing force to the release bearing.

In order to achieve this object, the present invention provides an automatic clutch device comprising: a flywheel attached to an end of a crankshaft of an engine; a clutch disk disposed at an end of an input shaft of a transmission, and opposed to the flywheel; a pressure plate configured to bias the clutch disk toward the flywheel; a release bearing configured to be movable toward and away from the pressure plate; and an axial force generating mechanism configured to press and move the release bearing toward the pressure plate; the automatic clutch device being configured such that, when the pressure plate is pressed by the release bearing, the flywheel and the clutch disk are disengaged from each other, wherein the axial force generating mechanism includes an electric motor having a rotor, and a rotation-linear motion conversion mechanism configured to convert rotation of the rotor of the electric motor to a linear motion of the release bearing, wherein the rotation-linear motion conversion mechanism includes: a plurality of tubes having different diameters from each other, and slidably fitted one in another such that the tubes form a telescopic tube assembly on the input shaft; and cam mechanisms each disposed between a respective radially adjacent pair of the tubes, and configured to convert rotation of a first tube of the respective radially adjacent pair of the tubes to a linear motion of a second tube of the respective radially adjacent pair of the tubes, the first tube having a larger diameter than the second tube, wherein one of the tubes which is largest in diameter is an input tube configured such that the rotation of the rotor of the electric motor is transmitted to the input tube, and another one of the tubes which is smallest in diameter is an output tube configured to press the release bearing, the automatic clutch device further comprising a reverse input blocking mechanism disposed in a torque transmission path extending from the electric motor to the output tube, and configured to block reverse input from the release bearing.

With this automatic clutch device, while the electric motor is off, the clutch disk is pressed against the flywheel under the biasing force of the pressure plate, and the clutch is engaged, so that the rotation of the engine crankshaft is transmitted to the input shaft of the transmission.

When the electric motor is activated, the rotation of the rotor of the electric motor is transmitted to the input tube of the telescopic tube assembly constituting the rotation-linear motion conversion mechanism, and the input tube rotates. The rotation of the input tube is converted to a linear motion of the output tube by the cam mechanisms, which each convert the rotation of the larger-diameter one of the corresponding radially adjacent pair of tubes to a linear motion of the smaller-diameter one of the pair, so that the telescopic tube assembly extends, and the output tube presses the release bearing.

Pressed by the output tube, the release bearing moves in the axial direction, thus pressing and elastically deforming the pressure plate until the clutch disk is not pressed by the pressure plate, and thus, the flywheel is not pressed by the clutch disk, i.e., until the automatic clutch device disengages. With the clutch device disengaged, power is not transmitted from the crankshaft to the input shaft.

Thus, by turning on and off the electric motor, the clutch device is selectively engaged and disengaged so that the power from the crankshaft can be selectively transmitted and not transmitted to the input shaft.

Since the rotation-linear motion conversion mechanism for converting the rotation of the rotor of the electric motor to a linear motion comprises a plurality of tubes having different diameters and forming a telescopic tube assembly, and cam mechanisms between the respective radially adjacent pairs of tubes, the telescopic tube assembly is on the input shaft, and the electric motor is disposed adjacent the outer periphery of the telescopic tube assembly, the automatic clutch device according to the present invention is compact in size. Since the power source of this clutch device is an electric motor, the clutch device can be easily mounted in position simply by properly arranging wires, and does not require a large installation space.

Since an electric motor can be quickly controlled without being influenced by changes in the surrounding environment such as a change in temperature, the automatic clutch device according to the present invention is sufficiently responsive.

Each of the cam mechanisms may comprise an inclined cam groove in one of the respective radially adjacent pair of the tubes, and a pin disposed on the other of the respective radially adjacent pair of the tubes, and slidably inserted in the cam groove.

The reverse input blocking mechanism may comprise the pins of the cam mechanisms, and circumferentially extending grooves each extending in the circumferential direction from one end of the cam groove of a respective cam mechanism. With this arrangement, when the pins are fitted in the respective circumferentially extending grooves, the pins prevent generation of component forces in the rotational direction, thus blocking reverse input from the release bearing.

The electric motor used in the automatic clutch device according to the present invention may be a hollow motor of which the rotor is a hollow rotor, or an electric motor of which the rotor is a solid shaft. If a hollow motor is used, since the input tube can be directly driven by the motor by fitting the motor onto the input member, the automatic clutch device can be made smaller in size.

If an electric motor of which the rotor is a solid shaft is used, the motor may be arranged perpendicular to the input shaft, or parallel to the input shaft.

If the electric motor is arranged perpendicular to the input shaft, a rotation transmission mechanism comprising a worm and a worm wheel is disposed between the rotor of the electric motor and the input tube to transmit the rotation of the rotor of the electric motor to the input tube through the rotation transmission mechanism. The worm and the worm wheel not only function as the rotation transmission mechanism, but as a reverse input blocking mechanism for blocking reverse input from the release bearing.

If the electric motor is arranged parallel to the input shaft, a rotation transmission mechanism comprising a pair of spur gears meshing with each other is disposed between the rotor of the electric motor and the input tube to transmit the rotation of the rotor of the electric motor to the input tube through the rotation transmission mechanism. In this case, a reverse input blocking clutch may mounted between the gear shaft of the input-side spur gear and the rotor of the electric motor to block reverse input from the gear shaft.

In order to achieve the above-specified object, the present invention provides, from another aspect of the invention, an automatic clutch device comprising: a flywheel attached to an end of a crankshaft of an engine; a clutch disk disposed at an end of an input shaft of a transmission, and opposed to the flywheel; a pressure plate configured to bias the clutch disk toward the flywheel; a release bearing configured to be movable toward and away from the pressure plate; and an axial force generating mechanism configured to press and move the release bearing toward the pressure plate, the automatic clutch device being configured such that, when the pressure plate is pressed by the release bearing, the flywheel and the clutch disk are disengaged from each other, wherein the axial force generating mechanism comprises: an electric motor having a rotor; and a rotation-linear motion conversion mechanism configured to convert rotation of the rotor of the electric motor to a linear motion of the release bearing, wherein the rotation-linear motion conversion mechanism includes: a tubular nut member disposed on the input shaft, and configured to be rotationally driven by the electric motor, the nut member having an inner periphery formed with an internal thread; and a tubular, externally threaded member having an outer periphery formed with an external thread which is in threaded engagement with the internal thread of the nut member such that, when the nut member rotates, the externally threaded member moves in an axial direction and presses the release bearing, wherein the automatic clutch device further comprises a reverse input blocking mechanism disposed between the electric motor and the nut member, and configured to allow transmission of the rotation of the rotor of the electric motor to the nut member, and block reverse input from the nut member.

With this automatic clutch device, while the electric motor is off, the clutch disk is pressed against the flywheel under the biasing force of the pressure plate, and the clutch is engaged, so that the rotation of the engine crankshaft is transmitted to the input shaft of the transmission.

When the electric motor is activated, the rotation of the rotor of the electric motor is transmitted to the nut member, and the nut member rotates. The rotation of the nut member is converted to an axial movement of the externally threaded member due to the nut member being in threaded engagement with the externally threaded member, so that the externally threaded member presses the release bearing.

Pressed by the externally threaded member, the release bearing moves in the axial direction, thus pressing and elastically deforming the pressure plate until the clutch disk is not pressed by the pressure plate, and thus, the flywheel is not pressed by the clutch disk, i.e., until the automatic clutch device disengages. With the clutch device disengaged, power is not transmitted from the crankshaft to the input shaft.

Thus, by turning on and off the electric motor, the clutch device is selectively engaged and disengaged so that the power from the crankshaft can be selectively transmitted and not transmitted to the input shaft.

Since the rotation-linear motion conversion mechanism for converting the rotation of the rotor of the electric motor to a linear motion comprises a nut member, and an externally threaded member in threaded engagement with the nut member, the nut member and the externally threaded member are both disposed on the input shaft, and the electric motor is disposed adjacent the outer periphery of the nut member, the automatic clutch device according to the present invention is compact in size. Since the power source of this clutch device is an electric motor, the clutch device can be easily mounted in position simply by properly arranging wires, and does not require a large installation space.

Since an electric motor can be quickly controlled without being influenced by changes in the surrounding environment such as a change in temperature, the automatic clutch device according to the present invention is sufficiently responsive.

The electric motor of the automatic clutch device of this embodiment may be arranged perpendicular to the input shaft, or parallel to the input shaft.

If the electric motor is arranged perpendicular to the input shaft, the rotation of the rotor of the electric motor is transmitted to the nut member through a worm and a worm wheel. The worm and the worm wheel not only function as a rotation transmission mechanism, but as a reverse input blocking mechanism for blocking reverse input from the nut member. Thus, it is not necessary to provide the automatic clutch device with an additional reverse input blocking mechanism, which makes it possible to make the automatic clutch device smaller.

If the electric motor is arranged parallel to the input shaft, the rotation of the rotor of the electric motor is transmitted to the nut member through a pair of spur gears meshing with each other. In this case, a reverse input blocking clutch is provided between the gear shaft of the input-side spur gear and the rotor of the electric motor to block reverse input from the nut member.

Even if a rotation transmission mechanism comprising a worm and a worm wheel is used too, a reverse input blocking clutch may be mounted between the gear shaft of the worm and the rotor of the electric motor to further effectively block reverse input.

According to the present invention, as described above, since the telescopic tube assembly on the input shaft is extended by driving the electric motor to linearly move the release bearing toward the pressure plate, compared to a conventional automatic clutch device in which the release fork is pivoted by the clutch release cylinder to move the release bearing toward the pressure plate, the automatic clutch device according to the present invention is compact in size, and does not require a large installation space.

Since the electric motor as the driving source is activated and deactivated by operating a switch, and its operation is not influenced by changes in the surrounding environment such as a change in temperature, the automatic clutch device according to the present invention is sufficiently responsive.

The reverse input blocking mechanism disposed in the torque transmission path extending from the electric motor to the output tube of the telescopic tube assembly blocks reverse input from the release bearing. This ensures that the automatic clutch device remains disengaged while the electric motor is de-energized, thus reducing consumption of electric energy and heat buildup in the electric motor.

Since, from another aspect of the invention, the rotation of the electric motor is converted to a linear motion of the release bearing by a rotation-linear motion conversion mechanism formed by a nut member on the input shaft, and an externally threaded member, to press the pressure plate with the release bearing, compared to a conventional automatic clutch device in which the release fork is pivoted by the clutch release cylinder to move the release bearing toward the pressure plate, the automatic clutch device according to the present invention is compact in size, and does not require a large installation space.

Since the electric motor as the driving source is activated and deactivated by operating a switch, and its operation is not influenced by changes in the surrounding environment such as a change in temperature, the automatic clutch device according to the present invention is sufficiently responsive.

The reverse input blocking mechanism disposed between the electric motor and the nut member to block reverse input from the nut member blocks reverse input from the release bearing, thus reliably keeping the automatic clutch device disengaged while it is supposed to be disengaged.

DETAILED DESCRIPTION OF THE INVENTION

Figure 1:
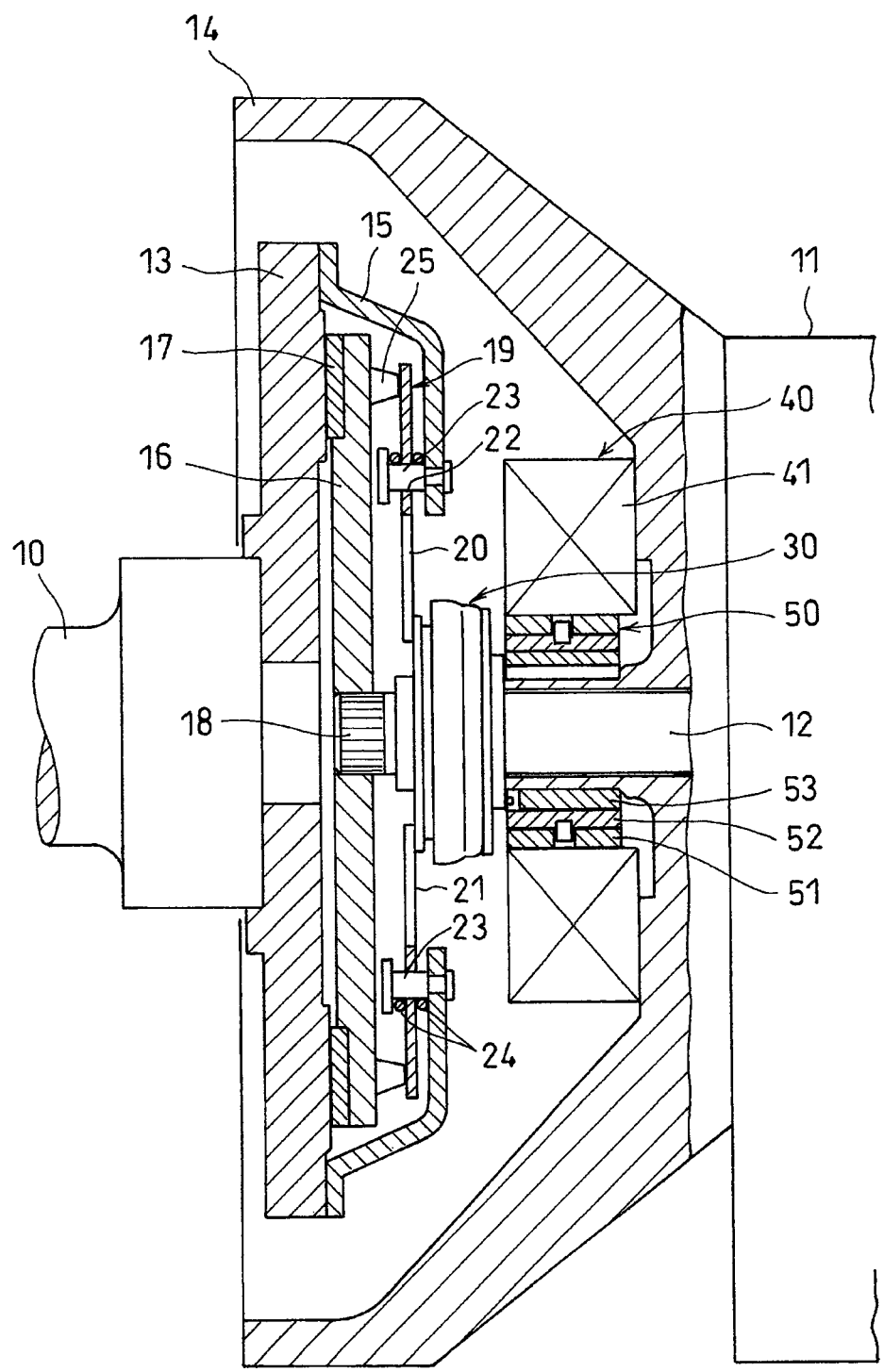
FIG. 1 is a sectional view of an automatic clutch device according to a first embodiment of the present invention.

The automatic clutch device according to the first embodiment of the present invention is now described with reference to FIGS. 1-10. As shown in FIG. 1, this automatic clutch device is used in a transmission 11 including gear-carrying parallel shafts of which the input shaft 12 is coaxial with the crankshaft 10 of the engine.

A flywheel 13 is fixed to the end of the crankshaft 10 opposed to the input shaft 12, and is located inside of, so as to be rotatable relative to, a clutch housing 14 of the transmission 11.

A clutch cover 15 is mounted to the outer peripheral portion of the outer side surface of the flywheel 13 that is opposed to the transmission 11. A clutch disk 16 is mounted in the clutch cover 15.

A facing 17 is fixed to the outer peripheral portion of the outer side surface of the clutch disk 16 that is opposed to the flywheel 13. The clutch disk 16 is fitted to serrations 18 formed on the outer periphery of the end of the input shaft 12 so as to be rotationally fixed and axially slidable, relative to the input shaft 12.

A pressure plate 19 is mounted inside of the clutch cover 15. The pressure plate 19 comprises a diaphragm spring. The diaphragm spring 19 is an annular member formed with radially extending slots 20 at its inner peripheral portion, and includes a spring piece 21 formed between each adjacent pair of the slots 20.

The diaphragm spring 19 further includes circumferentially equidistantly spaced apart pin holes 22 at its portion between the circle passing through the closed ends of the slots 20 and the radially outer surface of the diaphragm spring 19. Support pins 23 are mounted to the clutch cover 15, and each loosely inserted in one of the pin holes 22.

A pair of rings 24 are wrapped around the support pins 23 on the respective sides of the diaphragm spring 19 such that the diaphragm spring 19 is supported by the pair of rings 24 and the support pins 23.

The diaphragm spring 19 presses protrusions 25 on the outer peripheral portion of the clutch disk 16 toward the flywheel 13, thereby pressing the facing 17 against the flywheel 13. When the inner peripheral portion of the diaphragm spring 19 is pushed toward the flywheel 13, the facing 17 is no longer pressed against the flywheel 13, and the clutch disengages.

Figure 2:
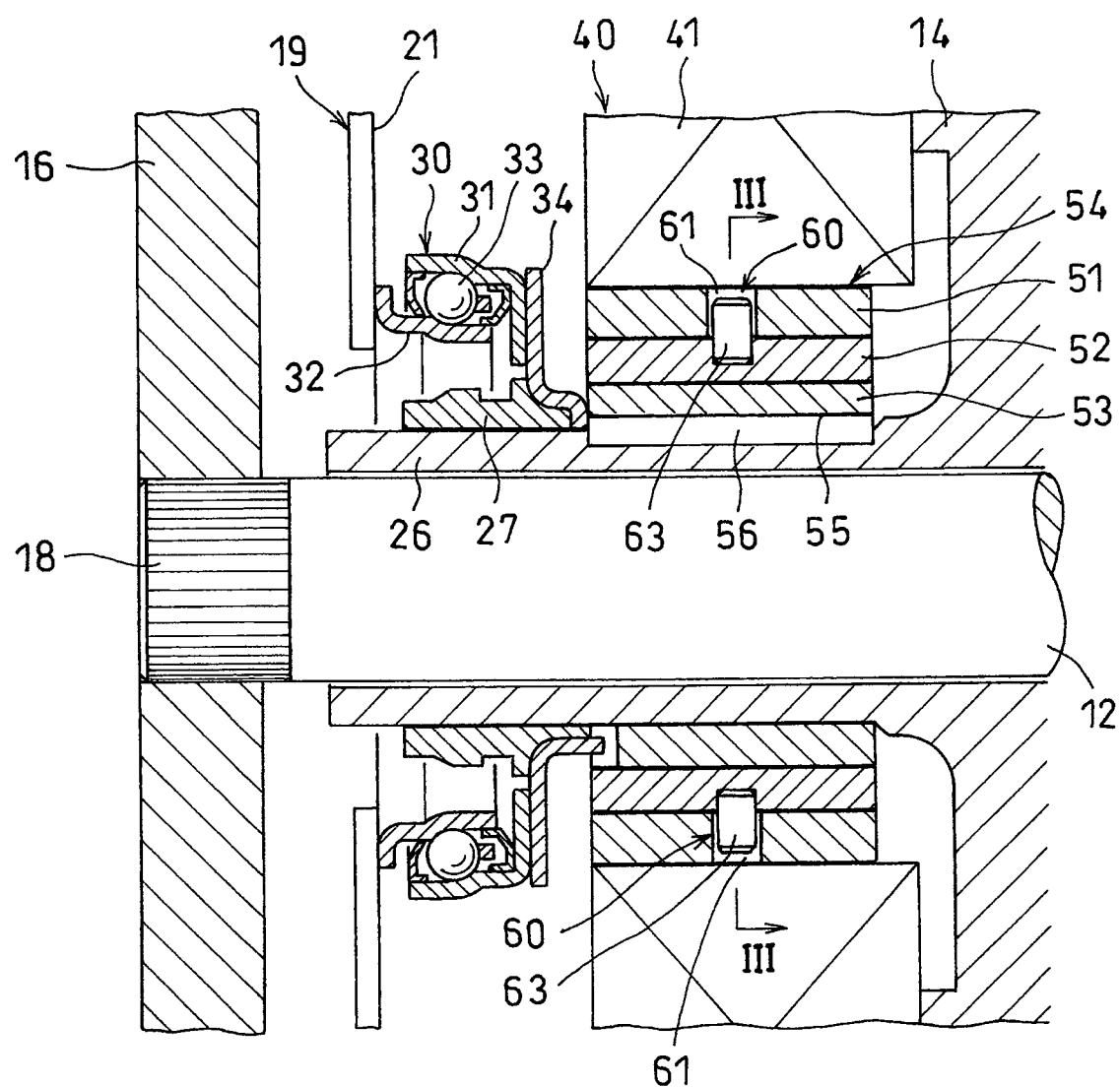
FIG. 2 is an enlarged sectional view of a portion of the automatic clutch device of FIG. 1, showing its release bearing.

As shown in FIG. 2, the clutch housing 14 includes a guide tube 26 covering the input shaft 12. A sleeve 27 is fitted on the guide tube 26. The sleeve 27 is non-rotatably but axially slidably supported by the guide tube 26.

A release bearing 30 surrounds the sleeve 27. The release bearing 30 includes an outer race 31, an inner race 32, and balls 33. The inner race 32 is connected to the inner peripheral portion of the diaphragm spring 19.

The outer race 31 is pressed toward the diaphragm spring 19 by an axial force generating mechanism 40 surrounding the guide tube 26.

The axial force generating mechanism 40 includes an electric motor 41, and a rotation-linear motion conversion mechanism 50 configured to convert the rotation of the rotor 42 of the electric motor 41 to a linear motion of the release bearing 30.

The electric motor 41 is a hollow motor supported by the clutch housing 14, and configured such that the rotation of its cylindrical rotor (not shown) is directly transmitted to the rotation-linear motion conversion mechanism 50.

Referring to FIGS. 2-6, the rotation-linear motion conversion mechanism 50 includes a telescopic tube assembly 54 which is an assembly of a plurality of tubes having different diameters from each other, the plurality of tubes being constituted by an outer tube 51, an intermediate tube 52, and an inner tube 53 that are slidably fitted one in another. The rotation-linear motion conversion mechanism 50 further includes cam mechanisms 60 disposed, respectively, between the outer tube 51 and the intermediate tube 52 and between the intermediate tube 52 and the inner tube 53, and configured to convert relative rotation of the tubes to relative linear motion thereof.

One of the cam mechanisms 60 comprises inclined cam grooves 61 formed in the outer tube 51, and pins 63 disposed on the intermediate tube 52 and slidably inserted in the respective cam grooves 61. The other cam mechanism 60 comprises inclined cam grooves 62 formed in the intermediate tube 52, and pins 64 disposed on the inner tube 53 and slidably inserted in the respective cam grooves 62. The inner tube 53 is rotationally fixed but slidable relative to the guide tube 26.

This rotation-linear motion conversion mechanism 50 is configured such that when its input tube, i.e., the outer tube 51 is directly rotationally driven by the hollow motor 41, the intermediate tube 52 moves axially while rotating due to the specific relationship between the cam grooves 61 of the outer tube 51 and the pins 63 of the intermediate tube 52, and the inner tube 53 moves axially due to the specific relationship between the cam grooves 62 of the intermediate tube 52 and the pins 64 of the inner tube 53, thereby pressing the outer race 31 of the release bearing 30.

In the embodiment, the three tubes, i.e., the outer tube 51, intermediate tube 52, and inner tube 53 constitute the telescopic tube assembly 54. However, the number of tubes that constitute the telescopic tube assembly 54 is not limited to three, provided it is more than one.

Figure 3:
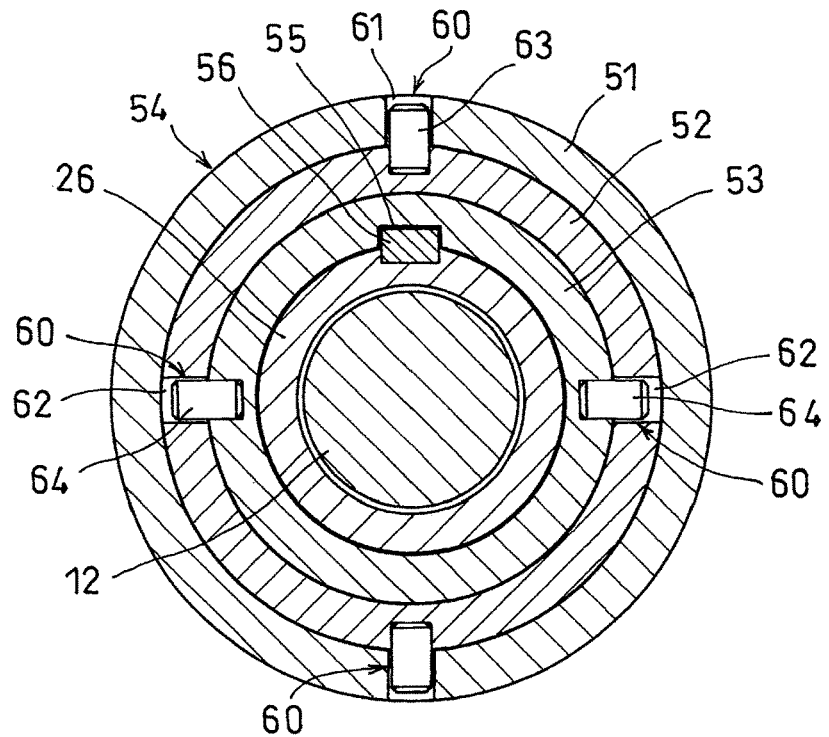
FIG. 3 is a sectional view taken along line III-III of FIG. 2.

In the embodiment, in order to prevent rotation, but allow sliding movement, of the inner tube 53 relative to the guide tube 26, keys 56 mounted to the guide tube 26 are slidably fitted in key grooves 55 formed in the radially inner surface of the inner tube 53 (see FIGS. 2 and 3). However, for the same purpose, the inner tube 53 may be fitted to the guide tube 26 in a different manner, for example, through serrations or splines.

The inner tube 53 of the rotation-linear motion conversion mechanism 50 axially presses (biases) the outer race 31 of the release bearing 30 by pressing a coupling plate 34 coupling, as shown in FIG. 2, the outer race 31 to the sleeve 27 so that the outer race 31 is not rotatable.

Figure 5:
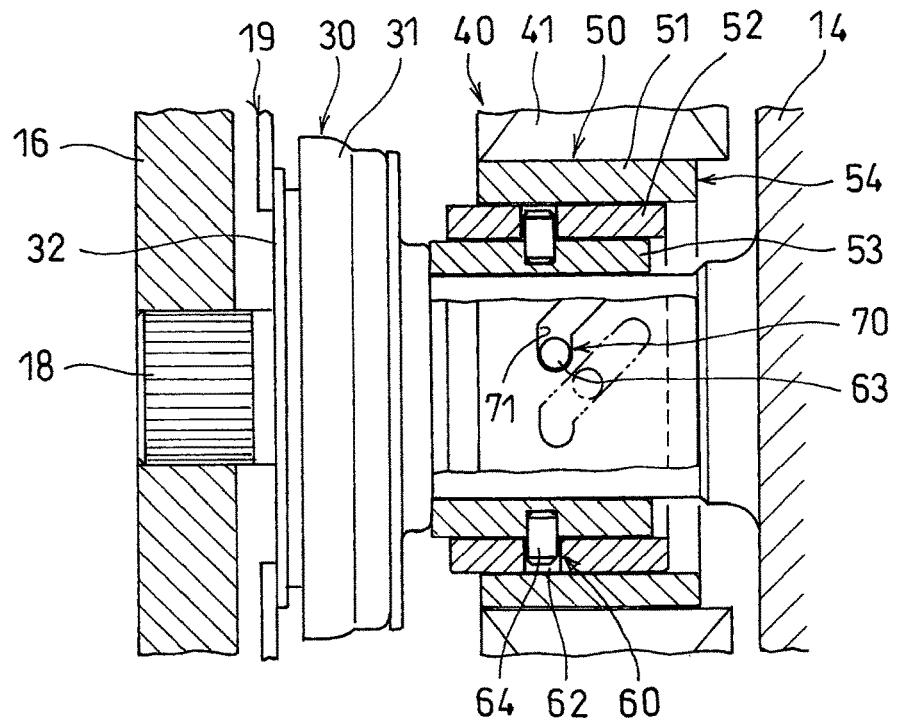
FIG. 5 is a sectional view of a telescopic tube assembly shown in FIG. 4, when it is extended.
Figure 6:
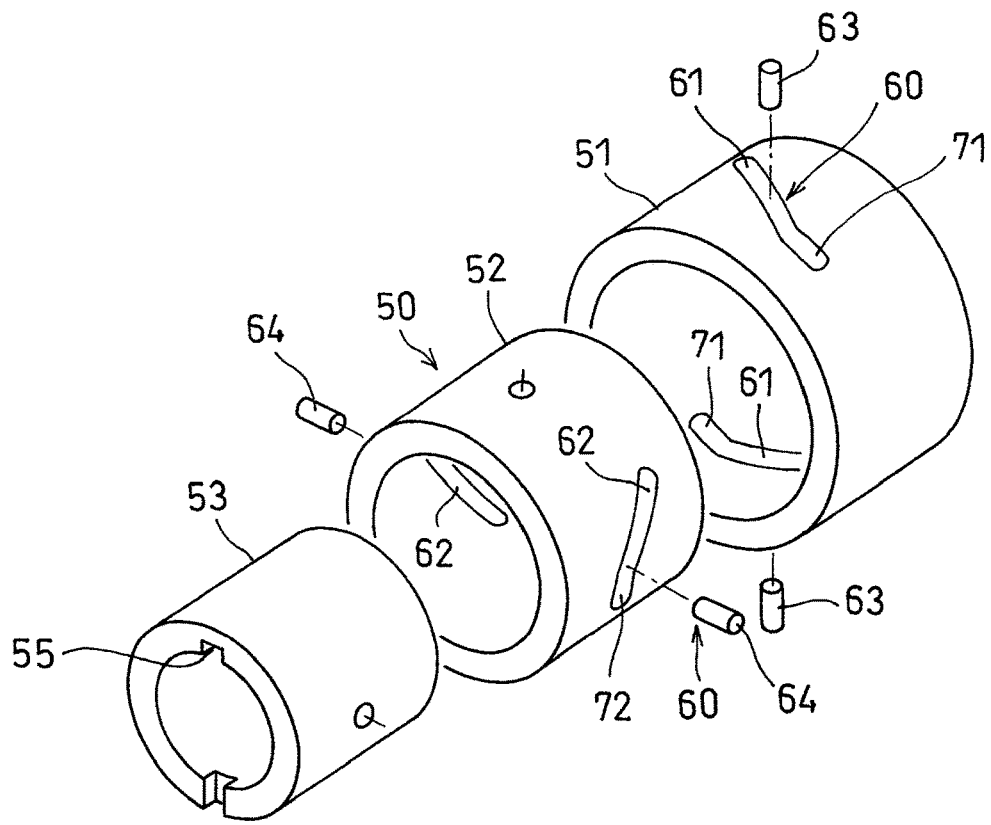
FIG. 6 is an exploded perspective view of a rotation-linear motion conversion mechanism shown in FIG. 2.

Referring to FIGS. 5 and 6, the cam mechanisms 60 include a reverse input blocking mechanism 70 configured to prevent the actuation of the rotation-linear motion conversion mechanism 50 under the reaction force from the diaphragm spring 19.

The reverse input blocking mechanism 70 includes circumferentially extending grooves 71 each circumferentially extending from one end of a respective cam groove 61 of the outer tube 51, circumferentially extending grooves 72 each circumferentially extending from one end of a respective cam groove 62 of the intermediate tube 52, and configured such that when the telescopic tube assembly 54 is extended due to relative rotation between the outer tube 51 and the intermediate tube 52 and between the intermediate tube 52 and the inner tube 53, the pins 63 and 64 engage in the respective circumferentially extending grooves 71 and 72. This prevents generation of component forces in the rotational direction, thereby blocking reverse input from the release bearing 30.

Now the operation of the automatic clutch device of the embodiment is described. In FIGS. 1 and 2, the telescopic tube assembly 54, which constitutes the rotation-linear motion conversion mechanism 50, is contracted. In this state, the clutch disk 16 is pressed against the flywheel 13 by the diaphragm spring 19, that is, the automatic clutch device is engaged, so that the rotation of the crankshaft 10 is transmitted to the input shaft 12.

Figure 4:
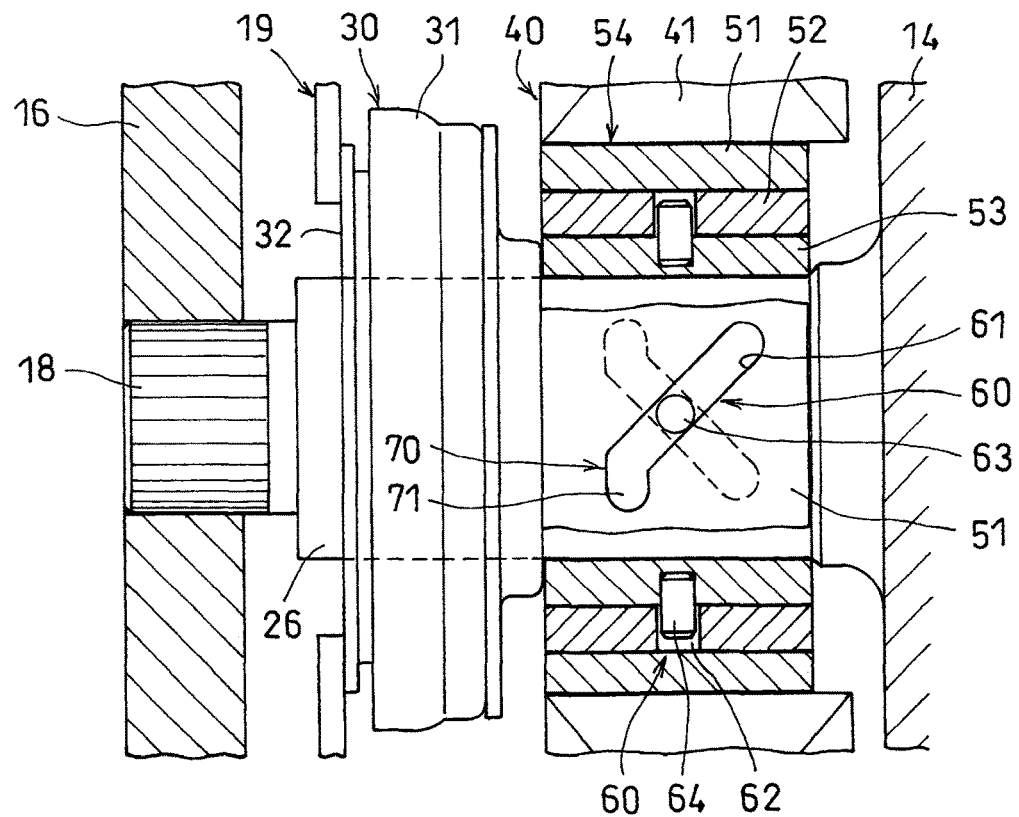
FIG. 4 is a lateral sectional view, partly showing the radially outer surface, of an input tube shown in FIG. 2.

With the automatic clutch device engaged, when the outer tube 51 of the rotation-linear motion conversion mechanism 50 is rotated by driving the hollow motor 41, since, as shown in FIGS. 3 and 4, the pins 63 of the intermediate tube 52 are inserted in the cam grooves 61 of the outer tube 51, the intermediate tube 52 moves axially while rotating. Since the pins 64 of the inner tube 53 are inserted in the cam grooves 62 of the intermediate tube 52, the rotation of the intermediate tube 52 causes the inner tube 53 to be moved axially. The telescopic tube assembly 54 is thus extended.

In FIG. 5, the telescopic tube assembly 54 is extended. When the telescopic tube assembly 54 is extended, the release bearing 30 is pushed and moved axially by the tube assembly 54, and presses the inner peripheral portion of the diaphragm spring 19, until the diaphragm spring 19 is moved to a position where the clutch disk 16 is not pressed by the diaphragm spring 19, that is, the clutch disengages, so that power is not transmitted from the crankshaft 10, shown in FIG. 1, to the input shaft 12.

In this state, due to rotation of the outer tube 51 relative to the intermediate tube 52, the pins 63 of the intermediate tube 52 are engaged in the circumferentially extending grooves 71 of the outer tube 51 (see FIG. 5). Also, due to rotation of the intermediate tube 52 relative to the inner tube 53, the pins 64 of the inner tube 53 are engaged in the circumferentially extending grooves 72 of the intermediate tube 52. This prevents generation of component forces in the rotational direction, thus blocking reverse input from the release bearing 30, so that the automatic clutch device remains disengaged.

That is, the automatic clutch device remains disengaged even when the hollow motor 41 is de-energized, so that it is possible to save electricity and reduce heat build-up.

Since the telescopic tube assembly 54 constituting the rotation-linear motion conversion mechanism 50 is disposed on the input shaft 12, and the hollow motor 41 is disposed on the outside of the telescopic tube assembly 54, the automatic clutch device of the embodiment shown in FIGS. 1-6 is extremely small in size. Since its power source is an electric motor 41, the clutch device can be easily mounted in position simply by properly arranging wires, and does not require a large installation space.

Figure 7:
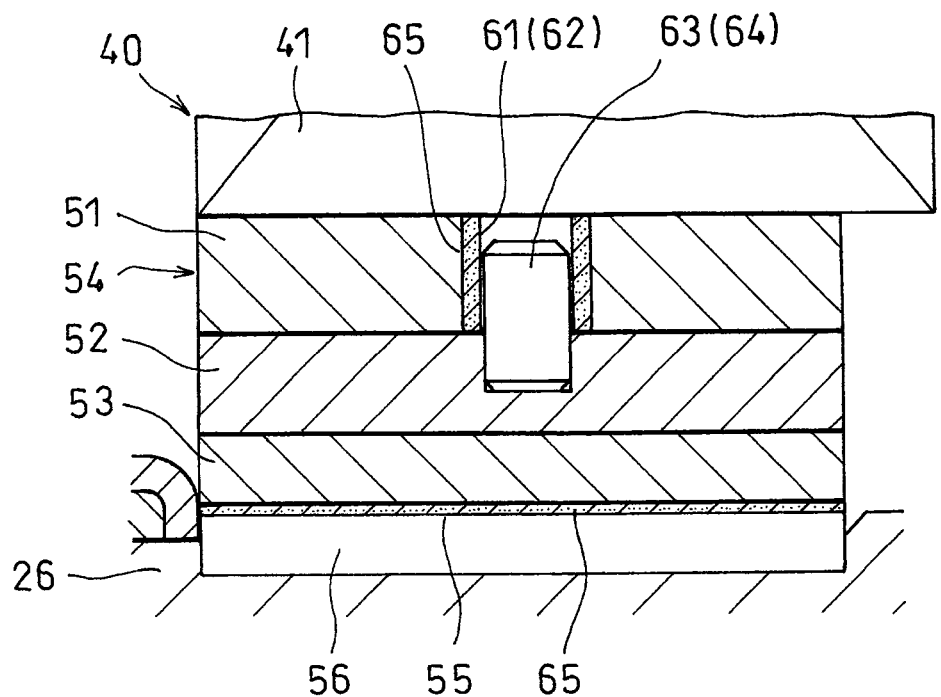
FIG. 7 is a sectional view of another example of a cam mechanism.
Figure 8:
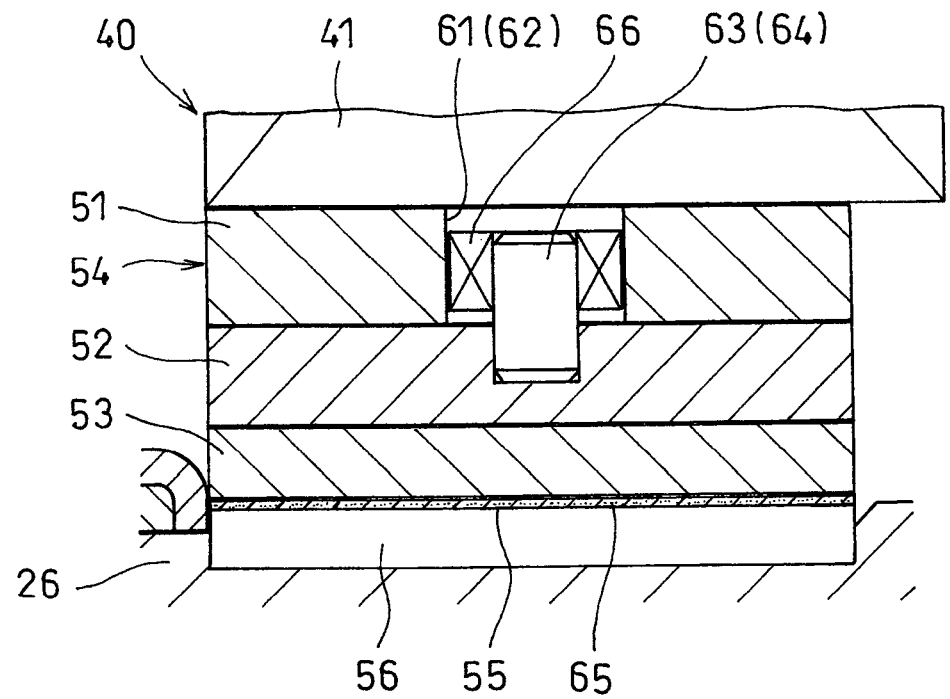
FIG. 8 is a sectional view of still another example of a cam mechanism.

As shown in FIG. 7, low-friction surface treatment layers 65 may be arranged on the inner surfaces of the cam grooves 61 and the inner surfaces of the key grooves 55 so that the telescopic tube assembly 54 can be smoothly extended and retracted. For the same purpose, as shown in FIG. 8, the slide bearings or rolling bearings 66 may be disposed around the pins 63 and 64.

Figure 9:
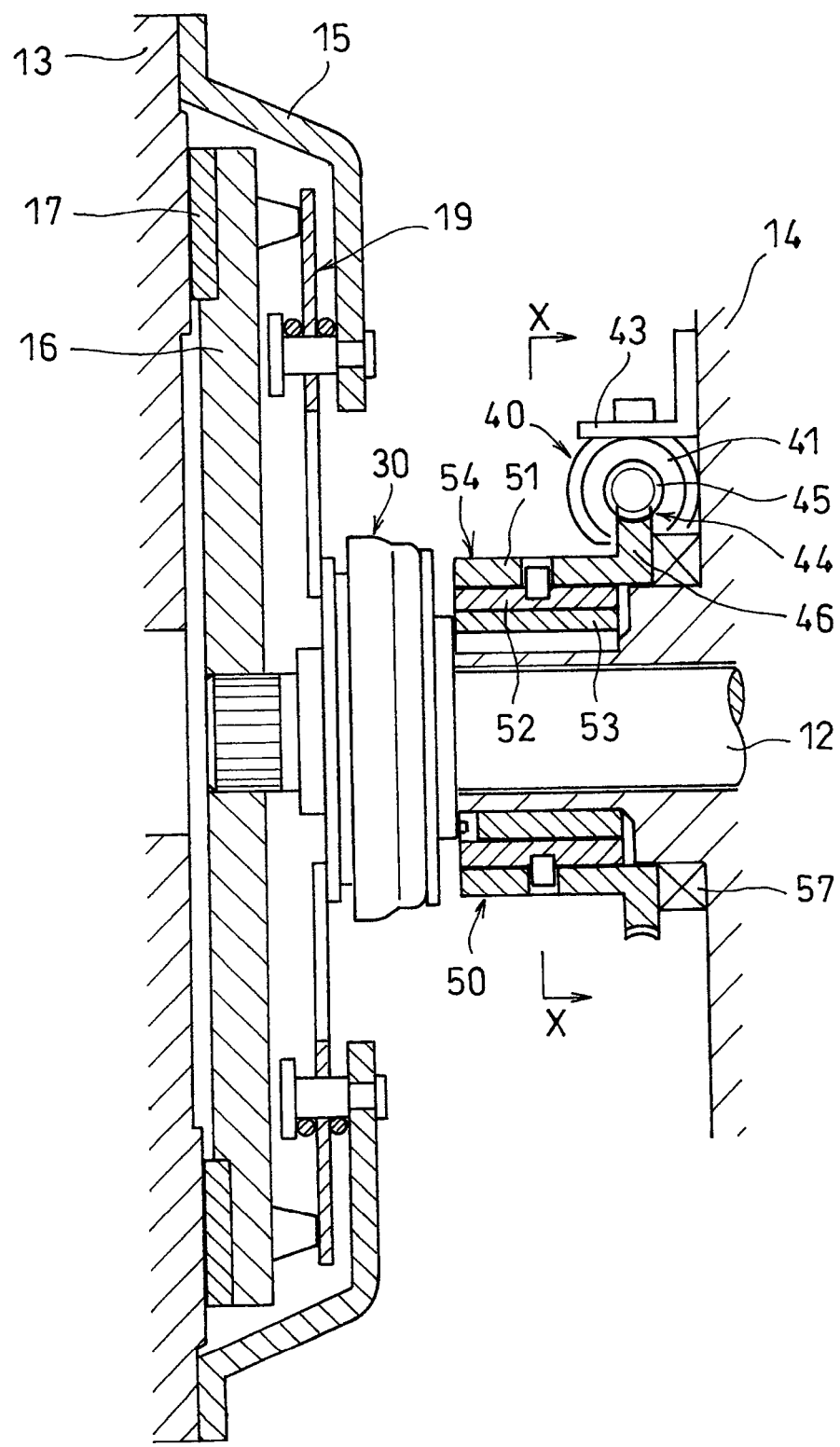
FIG. 9 is sectional view of a modification of the automatic clutch device of the first embodiment.
Figure 10:
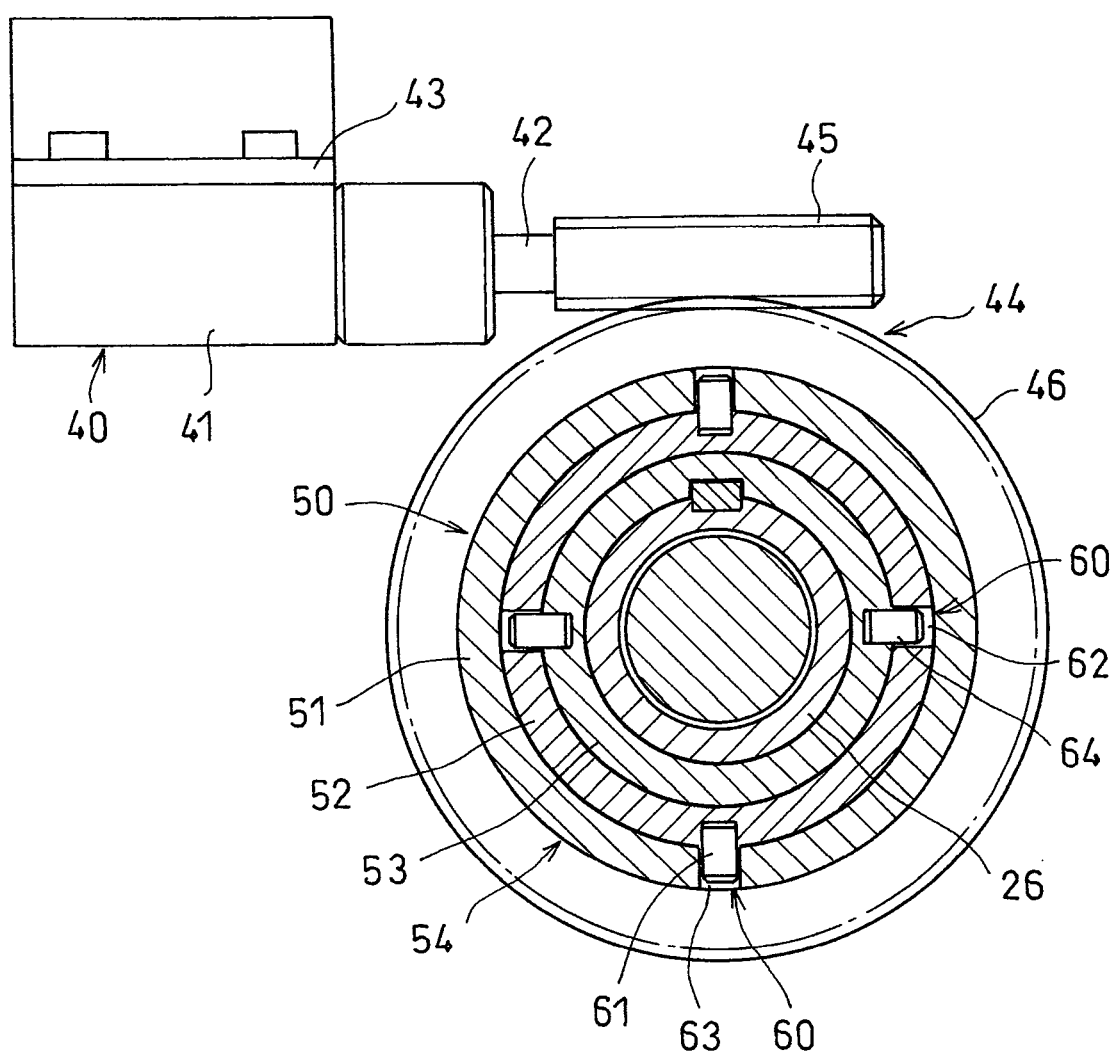
FIG. 10 is a sectional view taken along line X-X of FIG. 9.
Figure 11:
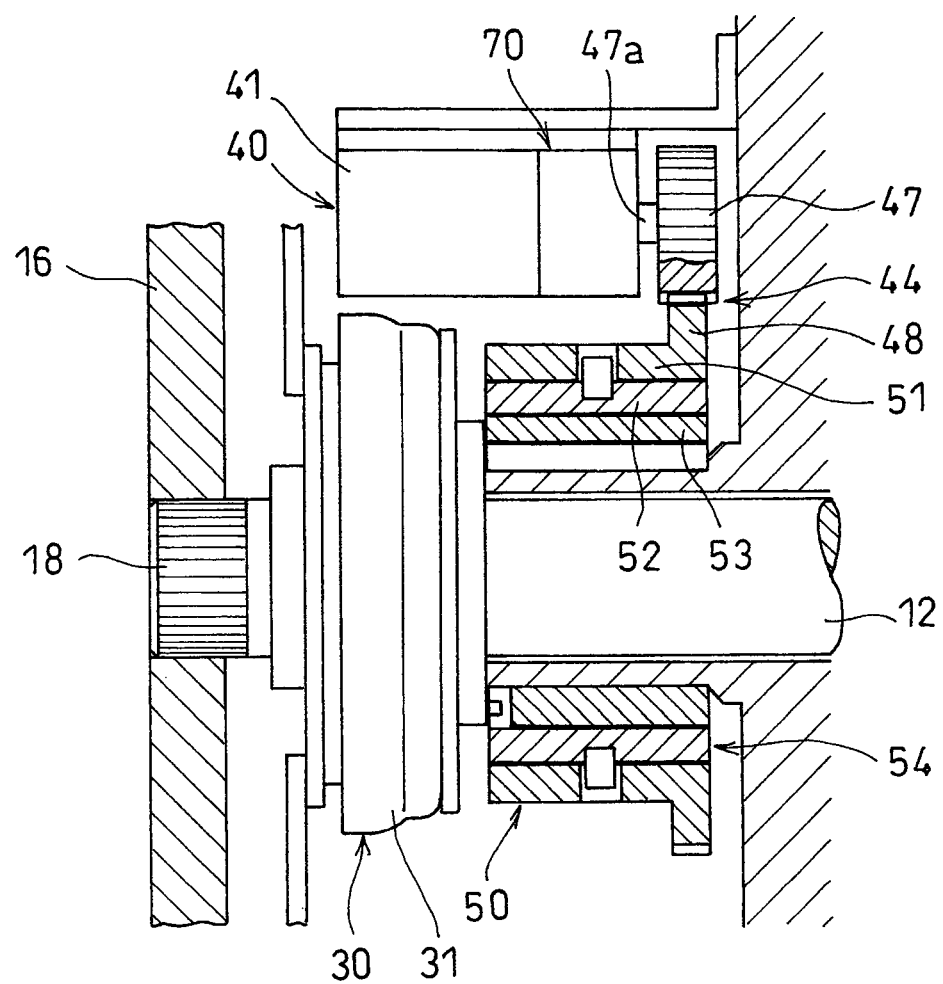
FIG. 11 is a sectional view of an automatic clutch device according to a second embodiment of the present invention.

Instead of a hollow electric motor 41 as shown in FIGS. 1 and 2, an electric motor 41 whose rotor 42 (see FIG. 10) is a solid shaft as shown in FIGS. 9-11 may be used.

In FIGS. 9 and 10, the electric motor 41 is supported by the clutch housing 14 through a bracket 43 to extend perpendicularly to the input shaft 12. The rotation of the rotor 42 of the electric motor 41 is transmitted to the outer tube 51 through a rotation transmission mechanism 44 comprising a worm 45 on the rotor 42 and a worm wheel 46 on the outer tube 51.

FIGS. 11 and 12 show a second embodiment of the present invention. In FIG. 11, the electric motor 41 is supported by the clutch housing 14 through a bracket 43 to extend parallel to the input shaft 12. The rotation of the rotor 42 of the electric motor 41 is transmitted to the outer tube 51 through a rotation transmission mechanism 44 comprising a spur gear 47 on the rotor 42 and a spur gear 48 on the outer tube 51.

The automatic clutch device shown in FIG. 11 includes, as the reverse input blocking mechanism 70, a reverse input blocking clutch mounted between the rotor 42 of the electric motor 41 and the gear shaft 47a of the spur gear 47 to block reverse input from the release bearing 30. Otherwise, the second embodiment is identical to the first embodiment.

When the rotation transmission mechanism 44 shown in FIG. 9 or 11 is used, the outer tube 51 is rotatably and axially immovably supported by a thrust bearing 57 mounted between the outer tube 51 and the clutch housing 14 as shown in FIG. 9.

Figure 12A:
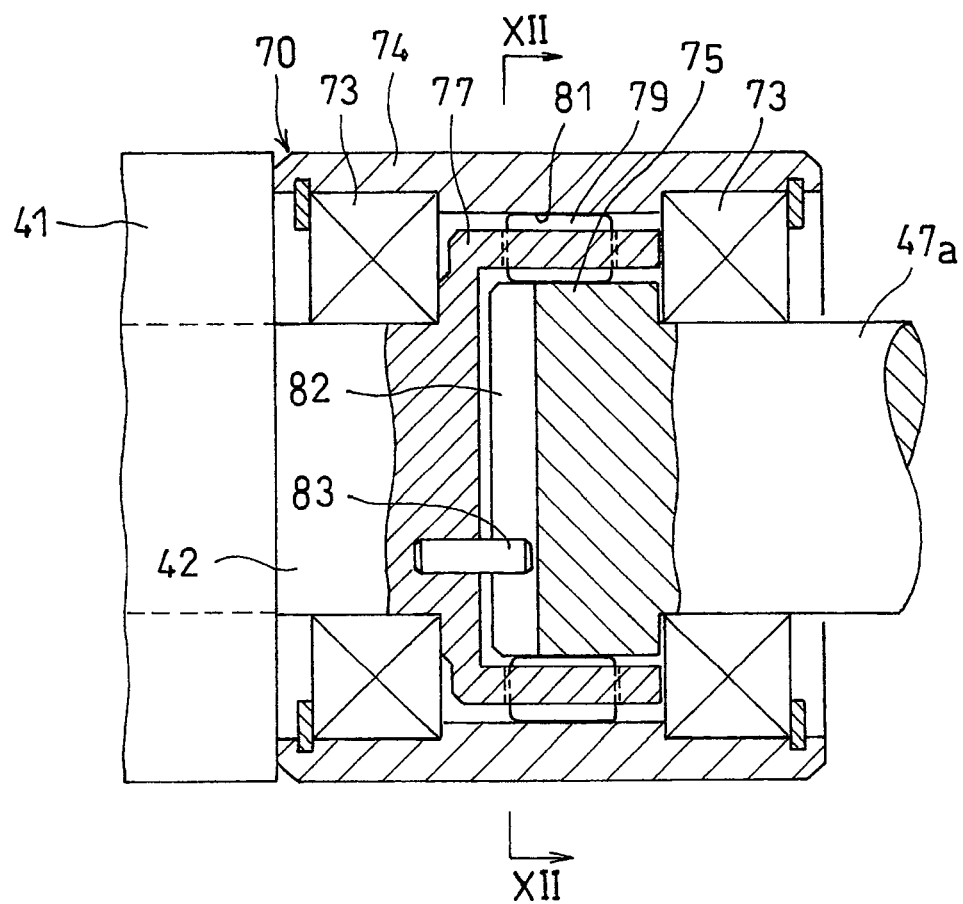
FIG. 12A is a sectional view of a modification of a reverse input blocking mechanism shown in FIG. 11.
Figure 12B:
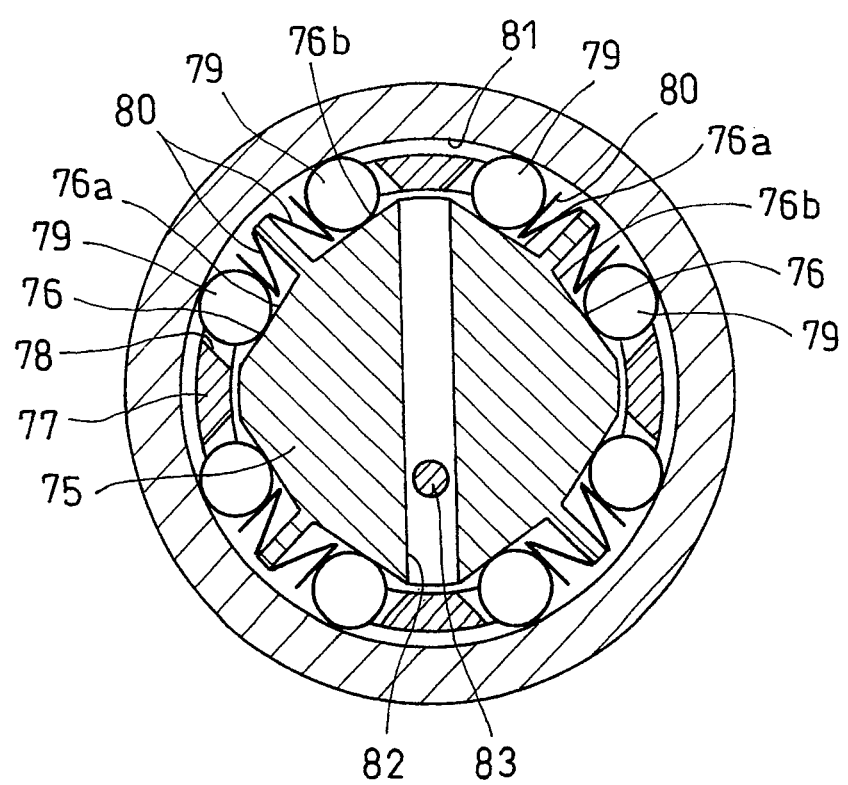
FIG. 12B is a sectional view taken along line XII-XII of FIG. 12A.

Referring to FIGS. 12A and 12B, the reverse input blocking clutch 70 includes a cylindrical clutch outer ring 74 supported by bearings 73 fitted, respectively, to the rotor 42 of the electric motor 41 and the gear shaft 47a such that the clutch outer ring 74 is rotatable relative to the rotor 42 and the gear shaft 47a. The clutch 70 further includes a clutch inner ring 74 disposed on the gear shaft 47a and located inside of the clutch outer ring 74 so as to be rotatable relative to the clutch outer ring 74. The clutch inner ring 75 has an outer periphery formed with a plurality of cam surfaces 76 spaced apart from each other in the circumferential direction and each including a pair of inclined surface portions 76a and 76b that are inclined in opposite directions to each other.

The reverse input blocking clutch 70 further includes a retainer 77 disposed at the end of the rotor 42 of the electric motor 41 such that the retainer 77 is located between, and rotatable relative to, the clutch outer ring 74 and the clutch inner ring 75. The retainer 77 has pockets 78 each facing the respective one of the cam surfaces 76 of the clutch inner ring 75. A pair of rollers 79 and an elastic member 80 are received in each pocket 78 such that the elastic member 80 is disposed between the pair of rollers 79 and biases the pair of rollers 79 in directions in which the pair of rollers 79 engage a cylindrical inner surface 81 of the clutch outer ring 74 and the corresponding cam surface 76.

A diametrically extending groove 82 is formed in the end surface of the clutch inner ring 75, while a torque transmission pin 83 is disposed on the end surface of the rotor 42 and loosely inserted in the diametrically extending groove 82.

This reverse input blocking clutch 70 is configured such that, when the electric motor 41 is activated and the rotor 42 rotates with the clutch outer ring 74 fixed in position, the retainer 77 rotates together with the rotor 42, so that the trailing, in the rotational direction, end surface of each pocket 78 of the retainer 77 pushes the rear, in the rotational direction, roller 79 in the pocket 78 until the roller 79 disengages from the cylindrical inner surface 81 and the cam surface 76. Thereafter, the torque transmission pin 83 abuts and presses one side surface of the diametrically extending groove 82, thus transmitting the rotation of the rotor 42 to the gear shaft 47a, and then to the outer tube 51 of the rotation-linear motion conversion mechanism 50 through the pair of spur gears 47 and 48.

Thus, the rollers 79, which are in the engaged positions, block reverse input applied from the release bearing 30, shown in FIG. 2, to the gear shaft 47a, i.e., prevent the reverse input from actuating the rotation-linear motion conversion mechanism 50, shown in FIG. 2.

This reverse input blocking clutch 70 can be used in an automatic clutch device in which, as shown in FIGS. 9 and 10, the electric motor 41 is arranged perpendicular to the input shaft 12. The reverse input blocking clutch 70 makes it possible to omit the circumferentially extending grooves 71 and 72 shown in FIGS. 5 and 6.

Figure 13:
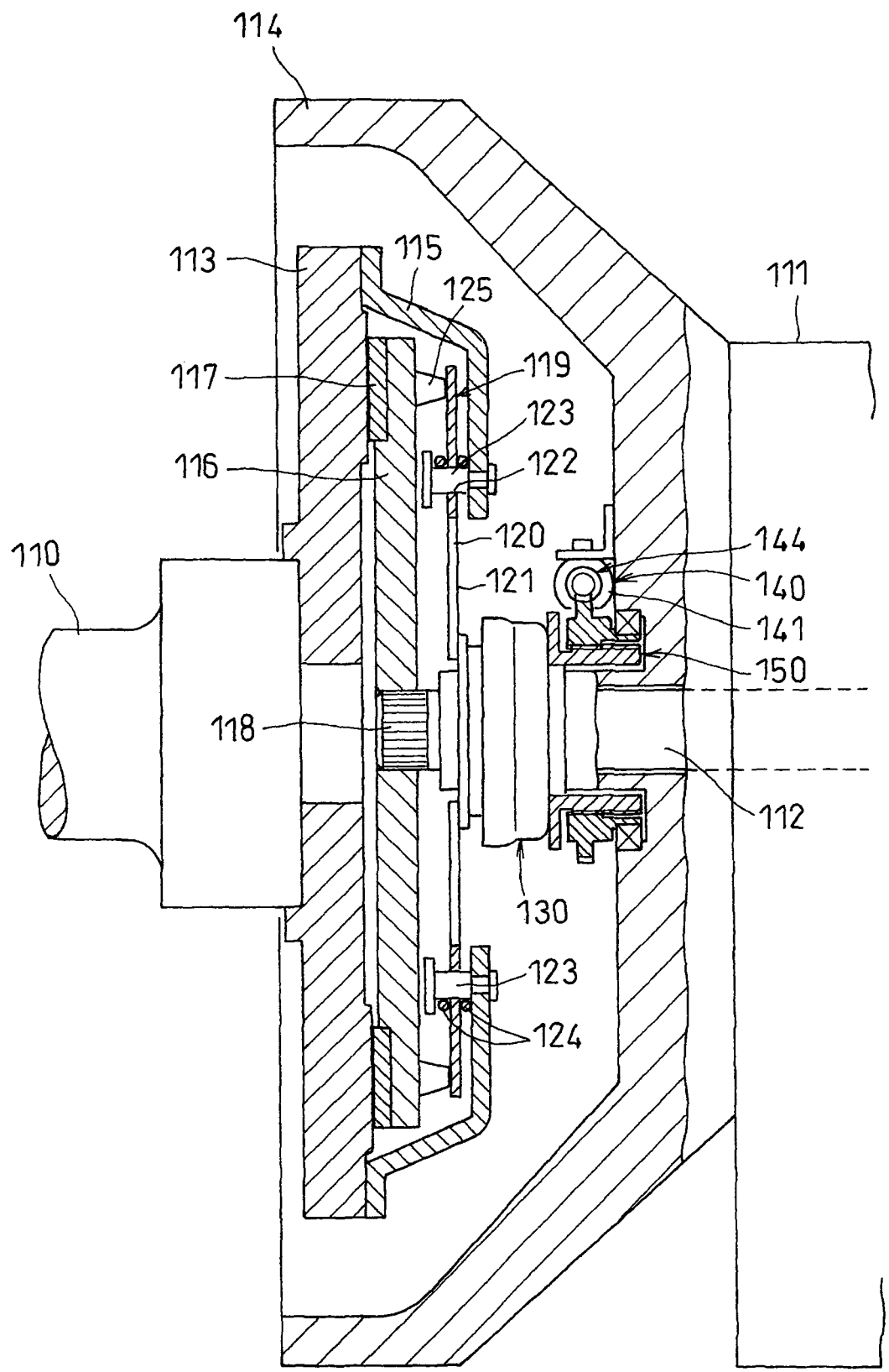
FIG. 13 is a sectional view of an automatic clutch device according to a third embodiment of the present invention.

The automatic clutch device according to the third embodiment of the present invention is now described with reference to FIGS. 13-15. As shown in FIG. 13, this automatic clutch device is used in a transmission 111 including gear-carrying parallel shafts of which the input shaft 112 is coaxial with the crankshaft 110 of the engine.

A flywheel 113 is fixed to the end of the crankshaft 110 opposed to the input shaft 112, and is located inside of, so as to be rotatable relative to, a clutch housing 114 of the transmission 111.

A clutch cover 115 is mounted to the outer peripheral portion of the outer side surface of the flywheel 113 that is opposed to the transmission 111. A clutch disk 116 is mounted in the clutch cover 115.

A facing 117 is fixed to the outer peripheral portion of the outer side surface of the clutch disk 116 that is opposed to the flywheel 113. The clutch disk 116 is fitted to serrations 118 formed on the outer periphery of the end of the input shaft 112 so as to be rotationally fixed and axially slidable, relative to the input shaft 112.

A pressure plate 119 is mounted inside of the clutch cover 115. The pressure plate 119 comprises a diaphragm spring. The diaphragm spring 119 is an annular member formed with radially extending slots 120 at its inner peripheral portion, and includes a spring piece 121 formed between each adjacent pair of the slots 120.

The diaphragm spring 119 further includes circumferentially equidistantly spaced apart pin holes 122 at its portion between the circle passing through the closed ends of the slots 120 and the radially outer surface of the diaphragm spring 119. Support pins 123 are mounted to the clutch cover 115, and each loosely inserted in one of the pin holes 122.

A pair of rings 124 are wrapped around the support pins 123 on the respective sides of the diaphragm spring 119 such that the diaphragm spring 119 is supported by the pair of rings 124 and the support pins 123.

The diaphragm spring 119 presses protrusions 125 on the outer peripheral portion of the clutch disk 116 toward the flywheel 113, thereby pressing the facing 117 against the flywheel 113. When the inner peripheral portion of the diaphragm spring 119 is pushed toward the flywheel 113, the facing 17 is no longer pressed against the flywheel 113, and the clutch disengages. The structure described above with respect to the third embodiment is identical to the structure of either of the first and second embodiments.

Figure 14:
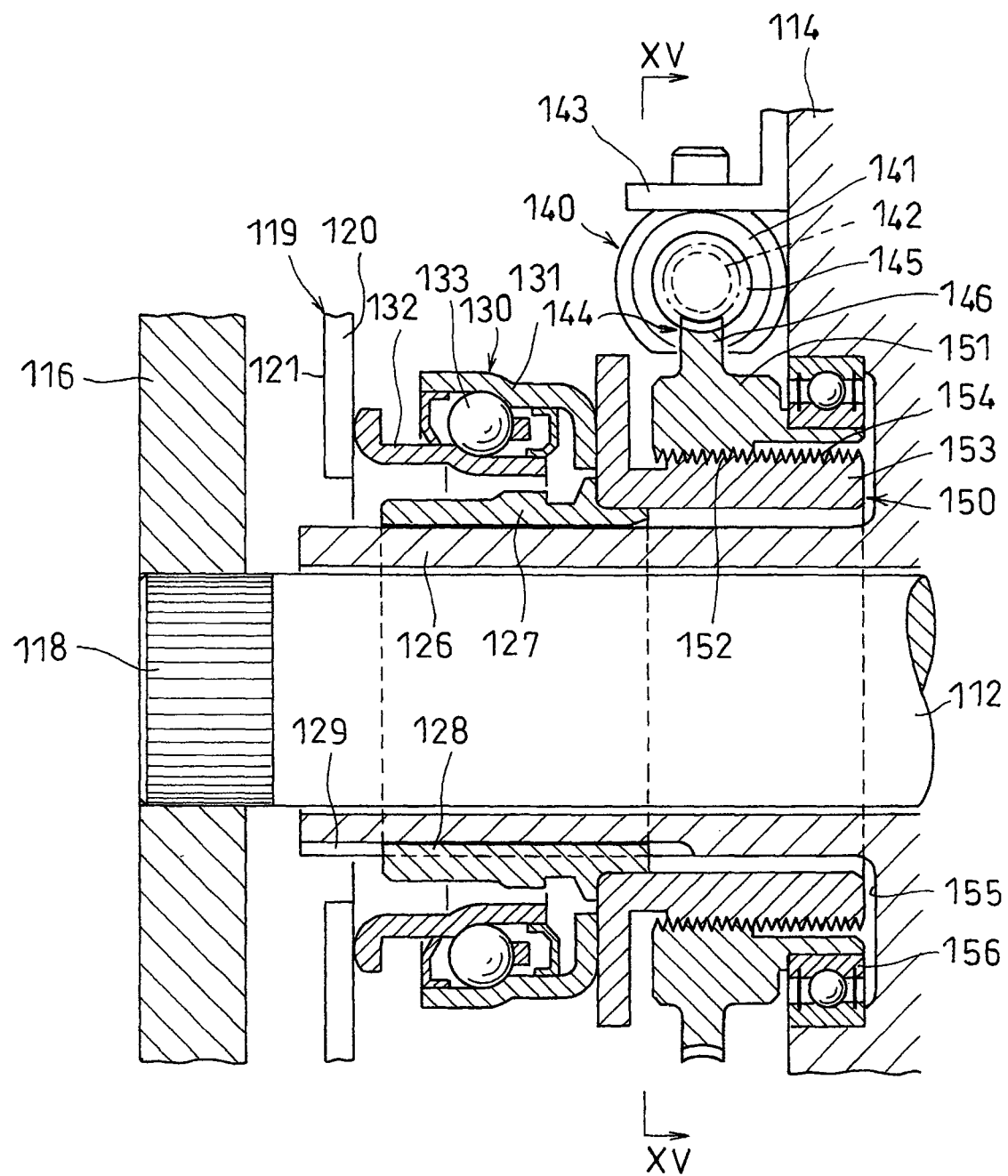
FIG. 14 is an enlarged sectional view of the automatic clutch device of FIG. 13, showing its release bearing.

As shown in FIG. 14, the clutch housing 114 includes a guide tube 126 covering the input shaft 112. A sleeve 127 is fitted on the guide tube 126. The sleeve 127 has, on the inner periphery thereof, keys 128 fitted in key grooves 129 formed in the outer periphery of the guide tube 126, so that the sleeve 127 is non-rotatably but axially slidably supported by the guide tube 126.

A release bearing 130 surrounds the sleeve 127. The release bearing 130 includes an outer race 131, an inner race 132, and balls 133. The inner race 132 is connected to the inner peripheral portion of the diaphragm spring 119.

The release bearing 130 is pressed toward the diaphragm spring 119 by an axial force generating mechanism 140 surrounding the guide tube 126.

The axial force generating mechanism 140 includes an electric motor 141, and a rotation-linear motion conversion mechanism 150 configured to convert the rotation of the rotor 142 of the electric motor 141 to a linear motion of the release bearing 130.

Figure 15:
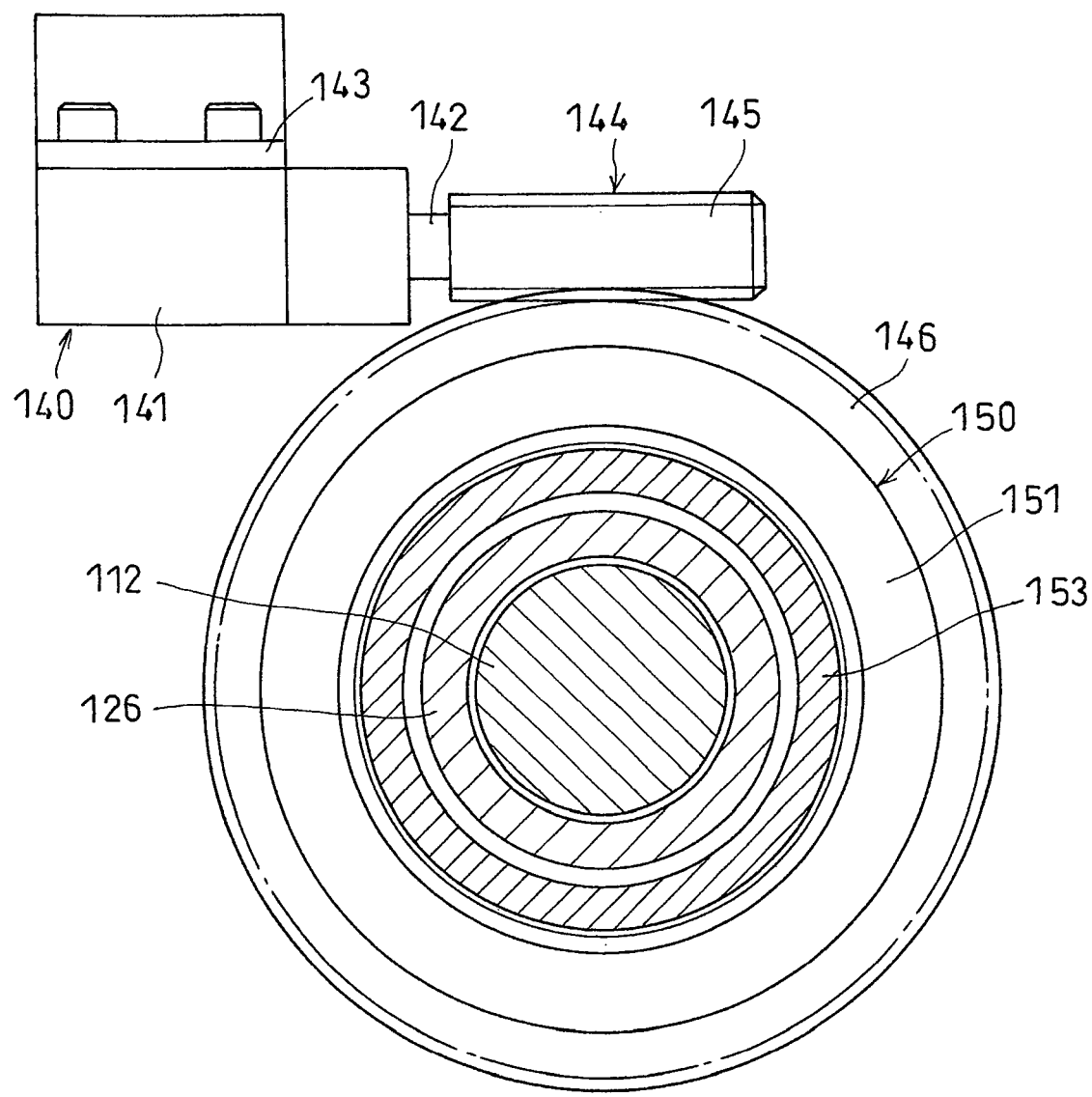
FIG. 15 is a sectional view taken along line XV-XV of FIG. 14.

As shown in FIG. 15, the rotor 142 of the electric motor 141 is a solid shaft, and as shown in FIGS. 14 and 15, and the electric motor 141 is arranged perpendicular to the input shaft 112 such that the rotation of the rotor 142 of the electric motor 141 is transmitted to the rotation-linear motion conversion mechanism 150 through a rotation transmission mechanism 144 comprising a worm 145 and a worm wheel 146.

The rotation-linear motion conversion mechanism 150 includes a tubular nut member 151 having an inner periphery formed with an internal thread 152, and an externally threaded member 153 having an outer periphery formed with an external thread 154 in threaded engagement with the internal thread 152 of the nut member 151.

The nut member 151 is coaxial with the input shaft 112, and is rotatably supported by a bearing 156 in a recess 155 formed in the closed end of the clutch housing 114. The worm wheel 146 is integrally formed on the outer peripheral portion of the nut member 151 so that the rotation of the rotor 142 of the electric motor 141 is transmitted to the nut member 151.

The externally threaded member 153 is a tubular member surrounding the guide tube 126, and connected to the sleeve 127 and the outer race 131 of the release bearing 130. Since, as described above, the sleeve 127 is rotationally fixed relative to the guide tube 126 by the keys 128 and the key grooves 129, the externally threaded member 153 is also rotationally fixed relative to the guide tube 126, while being axially movable.

In this embodiment, when the electric motor 141 is activated, and its rotor 142 rotates, the rotation is transmitted to the nut member 151 of the rotation-linear motion conversion mechanism 150, and the nut member 151 rotates. The rotation of the nut member 151 causes the externally threaded member 153, which is in threaded engagement with the nut member 151, to move axially and press the release bearing 130. Thus, the rotation-linear motion conversion mechanism 150 converts the rotation of the rotor 142 of the electric motor 141 to a linear motion of the release bearing 130.

FIG. 13 shows the automatic clutch device of this embodiment when the clutch disk 116 is pressed against the flywheel 113 by the diaphragm spring 119, and the clutch device is thus engaged. When the crankshaft 110 rotates in this state, the rotation is transmitted to the input shaft 112, and the input shaft 112 rotates in the same direction as the crankshaft 110.

When, with the clutch device engaged, the electric motor 141, shown in FIGS. 14 and 15, is activated, and its rotor 142 rotates, the rotation of the rotor 142 is transmitted to the nut member 151 through the worm 145 and the worm wheel 146, and the nut member 151 rotates.

Since the nut member 151 is in threaded engagement with the externally threaded member 153, and the externally threaded member 153 is rotationally fixed to the guide tube 126 through the sleeve 127, the rotation of the nut member 151 causes the externally threaded member 153 to be moved axially, and press the release bearing 130. The release bearing 130 thus moves axially and presses the inner peripheral portion of the diaphragm spring 119 toward the clutch disk 116. This moves the clutch disk 116 to a position where it is not pressed against the flywheel 113, i.e., disengages the clutch device, so that power is not transmitted from the crankshaft 110, shown in FIG. 13, to the input shaft 112.

While the clutch device is disengaged, the release bearing 130 is pressed axially by the reaction force of the diaphragm spring 119, so that reverse input is applied from the release bearing 130. However, since the worm 145 and the worm wheel 146, which constitute the rotation transmission mechanism 144 through which the rotation of the rotor 142 of the electric motor 141 is transmitted to the nut member 151, have the function of blocking the reverse input from the release bearing 130, that is, the reverse input from the release bearing 130 is blocked at the portions of the worm 145 and the worm wheel 146 meshing with each other, the automatic clutch device remains disengaged.

The automatic clutch device of the embodiment shown in FIGS. 13-15 is disengaged by converting the rotation of the electric motor 141 to a linear motion of the release bearing 130 with the rotation-linear motion conversion mechanism 150, which is constituted by the nut member 151 and the externally threaded member 153, and pressing the diaphragm spring 119 with the release bearing 130. Since the nut member 151 and the externally threaded member 153, which constitute the rotation-linear motion conversion mechanism 150, are disposed on the input shaft 12, the automatic clutch device of this embodiment is small in size. Since its power source is an electric motor 141, the clutch device can be easily mounted in position simply by properly arranging wires, and does not require a large installation space.

Since an electric motor 141 can be quickly controlled without being influenced by changes in the surrounding environment such as a change in temperature, the automatic clutch device of this embodiment is sufficiently responsive.

Figure 16:
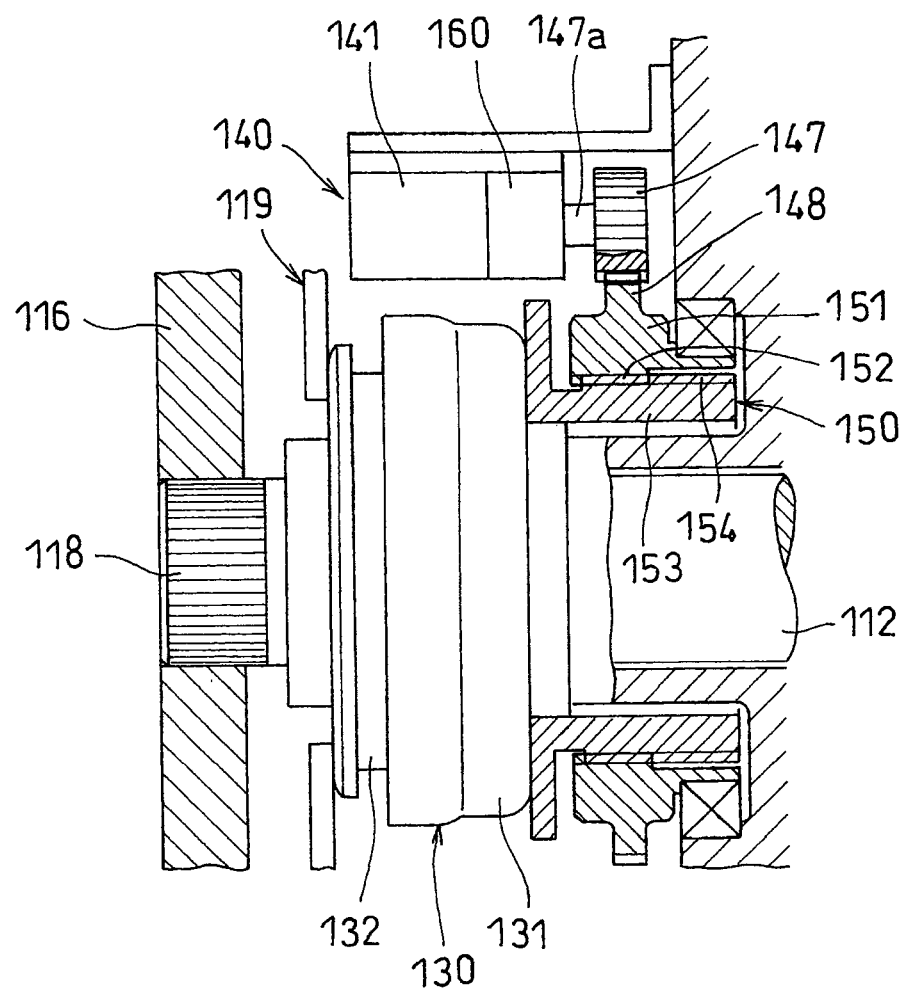
FIG. 16 is a sectional view of an automatic clutch device according to a fourth embodiment of the present invention.

FIGS. 16 and 17 show the fourth embodiment of the present invention. While in the third embodiment, as shown in FIG. 15, the electric motor 141 is arranged perpendicular to the input shaft 112, the electric motor 141 of the fourth embodiment is, as shown in FIG. 16, arranged parallel to the input shaft 112. In this case, the rotation of the electric motor 141 is transmitted to the nut member 151 through spur gears 147 and 148 meshing with each other.

In the automatic clutch device shown in FIG. 16, a reverse input blocking clutch 160 as the reverse input blocking mechanism is mounted between the rotor 142 of the electric motor 141 and the gear shaft 147a of the input-side spur gear 147 to block reverse input from the release bearing 130. Otherwise, the fourth embodiment is identical to the third embodiment.

Figure 17A:
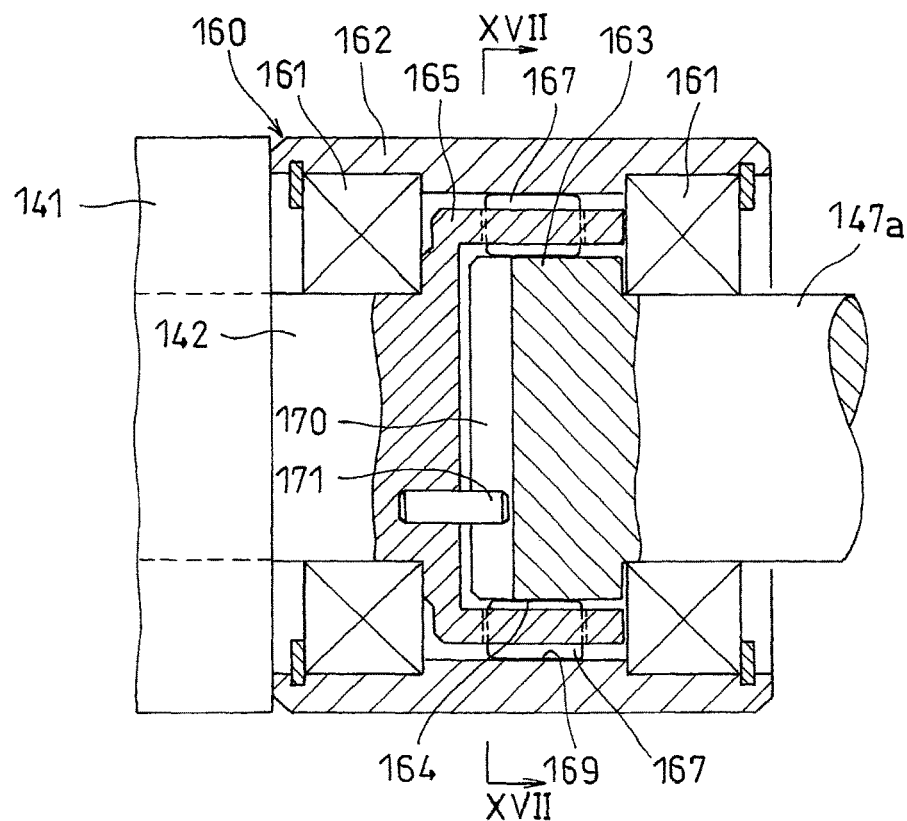
FIG. 17A illustrates a sectional view of a reverse input blocking mechanism shown in FIG. 16.
Figure 17B:
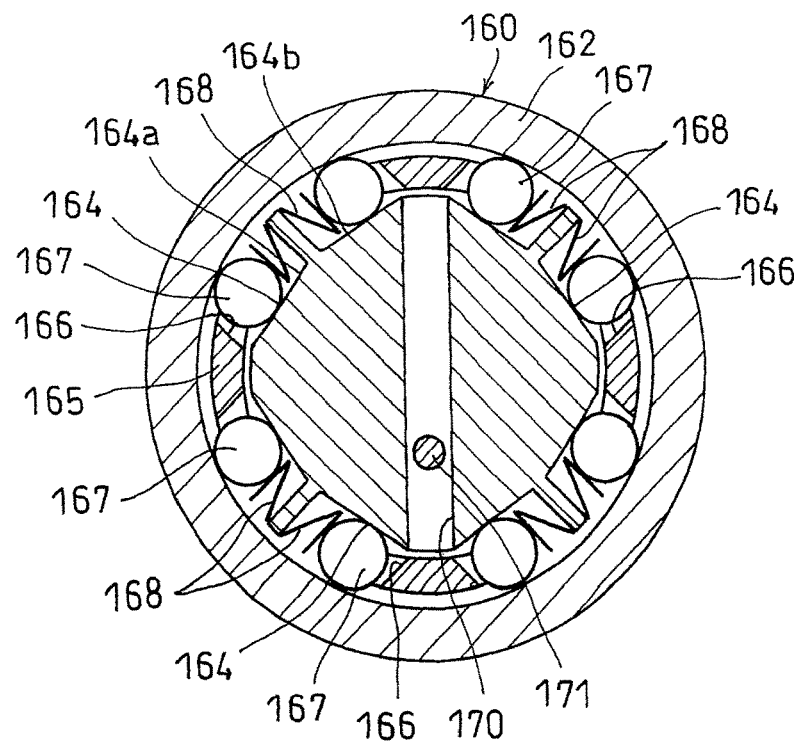
FIG. 17B is a sectional view taken along line XVII-XVII of FIG. 17A.

Referring to FIGS. 17A and 17B, the reverse input blocking clutch 160 includes a cylindrical clutch outer ring 162 supported by bearings 161 fitted, respectively, to the rotor 142 of the electric motor 141 and the gear shaft 147a such that the clutch outer ring 162 is rotatable relative to the rotor 142 and the gear shaft 147a. The clutch 160 further includes a clutch inner ring 163 disposed on the gear shaft 147a and located inside of the clutch outer ring 162 so as to be rotatable relative to the clutch outer ring 162. The clutch inner ring 163 has an outer periphery formed with a plurality of cam surfaces 164 spaced apart from each other in the circumferential direction and each including a pair of inclined surface portions 164a and 164b that are inclined in opposite directions to each other.

The reverse input blocking clutch 160 further includes a retainer 165 disposed at the end of the rotor 142 of the electric motor 141 such that the retainer 165 is located between, and rotatable relative to, the clutch outer ring 162 and the clutch inner ring 163. The retainer 165 has pockets 166 each facing the respective one of the cam surfaces 164 of the clutch inner ring 163. A pair of rollers 167 and an elastic member 168 are received in each pocket 166 such that the elastic member 168 is disposed between the pair of rollers 167 and biases the pair of rollers 167 in directions in which the pair of rollers 167 engage a cylindrical inner surface 169 of the clutch outer ring 162 and the corresponding cam surface 164.

A diametrically extending groove 170 is formed in the end surface of the clutch inner ring 163, while a torque transmission pin 171 is arranged on the end surface of the rotor 142 and loosely inserted in the diametrically extending groove 170.

This reverse input blocking clutch 160 is configured such that, when the electric motor 141 is activated and the rotor 142 rotates with the clutch outer ring 162 fixed in position, the retainer 165 rotates together with the rotor 142, so that the trailing, in the rotational direction, end surface of each pocket 166 of the retainer 165 pushes the rear, in the rotational direction, roller 167 in the pocket 166 until the roller 167 disengages from the cylindrical inner surface 169 and the cam surface 164. Thereafter, the torque transmission pin 171 abuts and presses one side surface of the diametrically extending groove 170, thus transmitting the rotation of the rotor 142 to the gear shaft 147a, and then to the nut member 151 of the rotation-linear motion conversion mechanism 150 through the pair of spur gears 147 and 148.

Thus, the rollers 167, which are in the engaged positions, block reverse input applied from the release bearing 130, shown in FIG. 16, to the gear shaft 147a, i.e., prevent the reverse input from actuating the rotation-linear motion conversion mechanism 150, shown in FIG. 16.

This reverse input blocking clutch 160 can be used in an automatic clutch device in which, as shown in FIG. 10 and FIGS. 14 and 15, the electric motor 141 is arranged perpendicular to the input shaft 112. The reverse input blocking clutch 160 makes it possible to more effectively block reverse input.

DESCRIPTION OF THE REFERENCE NUMERALS 10, 110. Crankshaft
11, 111. Transmission
12, 112. Input shaft
13, 113. Flywheel
16, 116. Clutch disk
19, 119. Diaphragm spring (pressure plate)
30, 130. Release bearing
40, 140. Axial force generating mechanism
41, 141. Electric motor
42, 142. Rotor
44, 144. Rotation transmission mechanism
45, 145. Worm
46, 146. Worm wheel
47, 147. Spur gear
48, 148. Spur gear
50, 150. Rotation-linear motion conversion mechanism
51. Outer tube (tube)
52. Intermediate tube (tube)
53. Inner tube (tube)
54. Telescopic tube assembly
60. Cam mechanism
61. Cam groove
62. Cam groove
63. Pin
64. Pin
70, 170. Reverse input blocking mechanism (reverse input blocking clutch)
71. Circumferentially extending groove
72. Circumferentially extending groove
151. Nut member
152. Internal thread
153. Externally threaded member
154. External thread
160. Reverse input blocking clutch (reverse input blocking mechanism)

What is claimed is:

1. An automatic clutch device comprising:
a flywheel attached to an end of a crankshaft of an engine;
a clutch disk disposed at an end of an input shaft of a transmission, and opposed to the flywheel;
a pressure plate configured to bias the clutch disk toward the flywheel;
a release bearing configured to be movable toward and away from the pressure plate;
an axial force generating mechanism configured to press and move the release bearing toward the pressure plate; and
a reverse input blocking mechanism;
wherein the flywheel, the clutch disk, the pressure plate, and the release bearing are configured and arranged such that, when the pressure plate is pressed by the release bearing, the flywheel and the clutch disk are disengaged from each other,
wherein the axial force generating mechanism includes an electric motor having a rotor, and a rotation-linear motion conversion mechanism configured to covert rotation of the rotor of the electric motor to a linear motion of the release bearing,
wherein the rotation-linear motion conversion mechanism includes:
a plurality of tubes having different diameters from each other, the tubes being slidably fitted one in another such that the tubes form a telescopic tube assembly on the input shaft; and
cam mechanisms each disposed between a respective radially adjacent pair of the tubes, each of the cam mechanisms being configured to convert rotation of a first tube of the respective radially adjacent pair of the tubes to a linear motion of a second tube of the respective radially adjacent pair of the tubes, the first tube having a larger diameter than the second tube,
wherein one of the tubes which is largest in diameter is an input tube configured such that the rotation of the rotor of the electric motor is transmitted to the input tube, and another one of the tubes which is smallest in diameter is an output tube configured to press the release bearing, wherein the reverse input blocking mechanism is disposed in a torque transmission path extending from the electric motor to the output tube, and is configured to block reverse input from the release bearing.

2. The automatic clutch device of claim 1, wherein each of the cam mechanisms comprises an inclined cam groove formed in one of the respective radially adjacent pair of the tubes, and a pin disposed on the other of the respective radially adjacent pair of the tubes, the pin being slidably inserted in the cam groove.

3. The automatic clutch device of claim 2, wherein the reverse input blocking mechanism comprises the pins of the cam mechanisms, and circumferentially extending grooves each extending in a circumferential direction from one end of the cam groove of a respective one of the cam mechanisms.

4. The automatic clutch device of claim 1, wherein the electric motor is a hollow motor of which the rotor is a cylindrical rotor, and wherein the rotor of the electric motor is fitted to the input tube such that the rotation of the rotor of the electric motor is directly transmitted to the input tube.

5. The automatic clutch device of claim 1, wherein the electric motor is arranged perpendicular to the input shaft, the rotor of the electric motor is a solid shaft, and the axial force generating mechanism further includes a rotation transmission mechanism between the rotor of the electric motor and the input tube, the rotation transmission mechanism comprising a worm and a worm wheel.

6. The automatic clutch device of claim 5, wherein the reverse input blocking mechanism comprises a reverse input blocking clutch disposed between the rotor of the electric motor and the rotation transmission mechanism, the reverse input blocking clutch being configured to allow transmission of the rotation of the rotor of the electric motor to the rotation transmission mechanism, and block reverse input from the rotation transmission mechanism.

7. The automatic clutch device of claim 1, wherein the electric motor is arranged parallel to the input shaft, the rotor of the electric motor is a solid shaft, and the axial force generating mechanism further includes a rotation transmission mechanism between the rotor of the electric motor and the input tube, the rotation transmission mechanism comprising a pair of spur gears that mesh with each other.

8. The automatic clutch device of claim 7, wherein the reverse input blocking mechanism comprises a reverse input blocking clutch disposed between the rotor of the electric motor and the rotation transmission mechanism, the reverse input blocking clutch being configured to allow transmission of the rotation of the rotor of the electric motor to the rotation transmission mechanism, and to block reverse input from the rotation transmission mechanism.

\* \* \* \* \*